(12) United States Patent
Barber et al.

(10) Patent No.: US 9,674,313 B2
(45) Date of Patent: Jun. 6, 2017

(54) ADAPTIVE PAYLOAD MANAGEMENT

(71) Applicant: International Business Machines Corporation, Armonk, NY (US)

(72) Inventors: Ronald J. Barber, San Jose, CA (US); Vincent Kulandai Samy, Hillsboro, OR (US); Sam S. Lightstone, Toronto (CA); Guy M. Lohman, San Jose, CA (US); Ippokratis Pandis, San Francisco, CA (US); Vijayshankar Raman, Sunnyvale, CA (US); Gregory R. Stager, Markham (CA); Wayne J. Young, Toronto (CA); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 14/819,548

(22) Filed: Aug. 6, 2015

(65) Prior Publication Data
US 2017/0041441 A1  Feb. 9, 2017

(51) Int. Cl.
*H04L 29/06* (2006.01)

(52) U.S. Cl.
CPC ............ *H04L 69/08* (2013.01); *H04L 69/24* (2013.01)

(58) Field of Classification Search
None
See application file for complete search history.

(56) References Cited

U.S. PATENT DOCUMENTS

| | | | |
|---|---|---|---|
| 7,174,047 B2 | 2/2007 | Lin et al. | |
| 7,782,812 B2* | 8/2010 | Jao | H04J 3/1623 370/321 |
| 8,244,718 B2 | 8/2012 | Chamdani et al. | |
| 9,294,487 B2* | 3/2016 | Curnyn | G06F 21/566 |
| 2006/0182046 A1 | 8/2006 | Dageville et al. | |
| 2007/0050777 A1 | 3/2007 | Hutchinson et al. | |
| 2009/0254516 A1 | 10/2009 | Meiyyappan et al. | |
| 2010/0070502 A1 | 3/2010 | Zigon | |
| 2011/0246432 A1 | 10/2011 | Yang et al. | |
| 2013/0073524 A1 | 3/2013 | Bentkofsky et al. | |

OTHER PUBLICATIONS

Defenders et al., Optimizing Rolling Hash Computation Using SIMD Vector Registers, An IP.com Prior Art Database Technical Disclosure, Apr. 16, 2013, pp. 1-4.

* cited by examiner

*Primary Examiner* — Hong Cho
(74) *Attorney, Agent, or Firm* — Lieberman & Brandsdorfer, LLC

(57) ABSTRACT

Embodiments of the invention relate to payload storage format for storing data in support of an aggregation function. As an input is subject to aggregation, the input is evaluated to ascertain a payload format for the aggregation. It is understood that there is more than one payload format. An evaluation of the aggregation key is a factor in the initial payload format. If the key is an addition to an existing aggregation, the evaluation considers changing the format of the payload to address processing and/or memory efficiency for the aggregation. The evaluation and the format change takes place dynamically so that the aggregation may continue.

20 Claims, 8 Drawing Sheets

ADAPTIVE PAYLOAD MANAGEMENT

BACKGROUND

The present invention relates to aggregation of data to find distinct values. More specifically, the invention relates to evaluating an aggregate payload and its format, and dynamically migrating the payload to a different format under one or more select conditions.

A query is a request for information from a database. In general, a query submission to a database returns records that match the query criteria. An aggregate function is a function that performs a computation on a set of values across a result set. In general, database management systems support a set of aggregate functions that can operate on a set of selected records. The aggregate function may be part of a query with the function producing an output of data. Data is produced form the aggregation function, and is generally stored in a data structure format to maintain the data needed to produce the result of the aggregation function. The data structure format is referred to herein as a payload format.

It is understood that an aggregation to find distinct values may vary, with some aggregations having a minimal set of values, and other aggregations having a large set of values. For aggregations with a large set of values, it is understood that the payload format in the form of a hash table may be maintained to store distinct values. However, for the group with a minimal set of values, the use of a hash table is not efficient. Accordingly, the same payload format is not efficient for each aggregation group.

SUMMARY

The invention includes a method, computer program product and system for adaptive migration of an aggregate payload format.

The method, computer program product, and system scan an input data set and aggregate the scanned input set on a select key and value. The aggregation is evaluated based on the storage format of the payload. An initial format of an aggregation result is selected, with the selection based on an aggregation function. An updated aggregation payload is stored in the selected format. In response to a subsequent aggregation of keys and values, the aggregation is subject to evaluation. More specifically, based on the evaluation, the aggregation is dynamically re-evaluated and selectively migrated to a new format.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
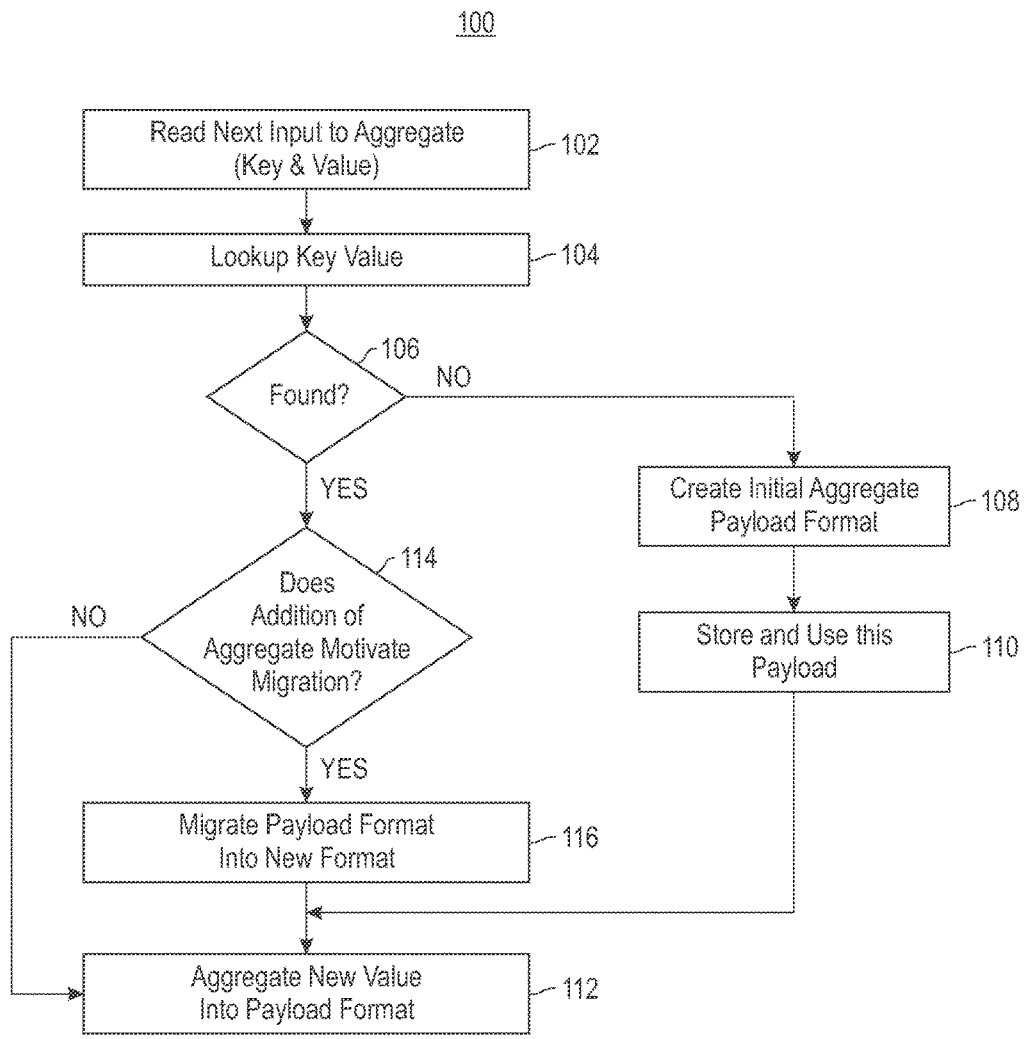
FIG. 1 depicts a block diagram illustrating a process for assessing an aggregation and dynamically migrating an aggregation result set format.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Aggregation is used and described herein to find distinct values in each group in query processing. Efficient processing is challenging due to the large memory outlay required to support the aggregation. Also, the aggregation can be expensive due to computer processing cost. In one embodiment, a Group By statement is used in conjunction with the aggregate function(s) to group the result set by one or more columns. Then, within each group a hash table or alternate data format maintains the distinct values in the group. The data format for organizing and storing the output is referred to herein as a data structure. Other examples of data structures may include a simple list and a bitmap, although these forms should not be considered limiting. Different forms of the data structures are efficient, along dimensions of memory efficiency and of processing efficiency, based on the quantity of distinct values. For example, the simple list may provide optimal efficiency for a small quantity of distinct values, whereas the hash table is more efficient for a large quantity of distinct values. At the same time, converting between data structure formats is expensive. Accordingly, a method is described herein to support adaptive selection of a data structure supporting optimal efficiency.

It is to be recognized that this efficiency is not evaluated just for one query, but rather in a potentially dynamically changing resource environment. For example, due to concurrent queries, memory availability may fluctuate, and a format that was sufficiently memory-efficient at the beginning of a query may become unaffordable later on, necessitating a format change. The methods described in this invention can also be applied to compute other aggregation results besides just computing the number of distinct values, such as computing sums, averages, variances and other statistical functions. In such other aggregates, other aspects of aggregation efficiency also arise, such as numerical stability of the aggregation result. These also influence the choice of data structure format.

Data structure formats are adaptively selected for processing and memory efficiency. With reference to FIG. 1, a flow chart (100) is provided illustrating a process for assessing an aggregation and dynamically migrating an aggregation result set format. As shown, the aggregation function is processed by reading the next input value to aggregate (102). In one embodiment, the aggregation employs looping through values on an input data set and employing a Group By statement on a key and a value. The key value in the Group By statement is ascertained (104), followed by an assessment to determine if any values for the key at step (104) have been previously aggregated (106). More specifically, the assessment at step (106) is searching for statistics on this key, or in one embodiment similar keys. A data structure format to maintain the aggregation state, e.g. the data needed to produce the result of the aggregate function, is referred to herein as a payload storage format. More specifically, the payload format encompasses a current aggregate state to compute the aggregate. For example, for a sum aggregate, the payload format is an accumulator. Accordingly, the assessment evaluates the aggregation with respect to the payload storage format.

A non-affirmative response to the assessment at step (106) is followed by creating an initial data payload format, with the format based on the type of aggregation (108). In one embodiment, the aggregation function determines the initial payload format. As described above, there are a variety of payload formats available. The goal is to select a payload format that is efficient for the aggregation output. In one embodiment, the payload format is selected based on characteristics of the data to be stored. The initial payload format is stored (110), and the aggregation is stored in the formatted payload (112).

An affirmative response to the assessment at step (106) is an indication that the keys and values of the aggregation have been previously stored in a formatted payload. One aspect of the embodiments is to utilize historical knowledge to ascertain and employ an efficient payload format for the aggregation. The historical knowledge serves as a motivating factor for selection of the payload format. Following the affirmative response to the assessment at step (106), a dynamic evaluation of the aggregation takes place to determine if the aggregation is a motivation for migration of the formatted payload to a new payload format (114). An affirmative response to the determination at step (114) is following by selecting the new payload format and migrating the formatted payload to the new payload format (116). A non-affirmative response to the determination at step (114) or following the migration at step (116) is followed by a return to step (112) to store the aggregation in the formatted payload, which is either the new payload format from step (116) or the initial payload format at step (110). There are multiple payload formats available. One aspect of selecting an appropriate format is dependent on characteristics of the aggregation. In one embodiment, processing may be suggestive of the appropriate payload format. In one embodiment, conversion between payload formats may be expensive.

Accordingly, the process shown herein demonstrates a dynamic evolution of payload formats based on the aggregation selected, including but not limited to the aggregation function and an aggregation characteristic.

Figure 2:
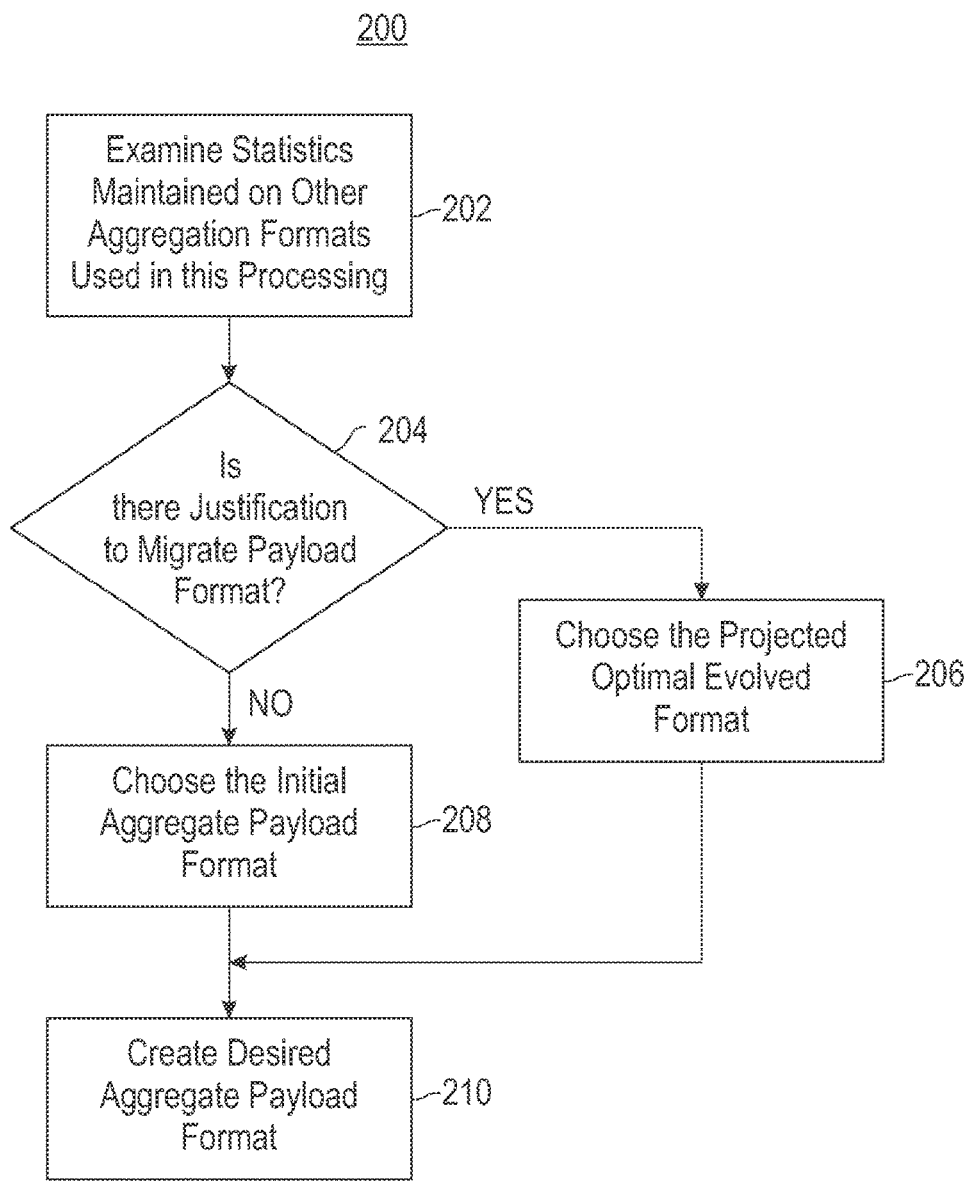
FIG. 2 depicts a flow chart illustrating a process for creating an aggregate payload format.

Referring to FIG. 2, a flow chart (200) is provided illustrating a process for creating an aggregate payload format. As described above, the process of converting a payload with stored aggregate data to a different format is expensive, and as such, conversion between formats is limited. One aspect of the embodiments is to create an initial payload format that is optimal. As shown, statistics are maintained on other aggregation formats used in this processing, and these statistics are evaluated (202). In one embodiment, the statistics and evaluation may be based on a prior aggregation for other aggregation keys in this query or previous queries. Based on the evaluation at step (202), it is determined if there is justification to migrate the payload format (204). A response to the determination at step (204) is followed by deciding a payload format for the aggregation. More specifically, an affirmative response to the determination at step (204) is followed by selecting an optimal payload format (206), and a non-affirmative response to the determination at step (204) is followed by maintaining the initial payload format (208). Following either step (206) or (208), a desired payload format from the aggregation is created (210). Accordingly, the process shown herein demonstrates an evaluation for the payload format migration.

As shown, the process of evaluating a payload format includes assessing characteristics of the aggregation, such as the function used for the aggregation. For an initial payload format, the function of the aggregation may dictate the format selection. In one embodiment, existing payload formats may be evaluated to ascertain if one of those formats may be related to or have one or more characteristics related to the aggregation. One aspect of the payload format selection and/or evaluation pertains to efficiency. Different payload formats may be optimal for different aggregations. For example, in one embodiment, the size of the aggregation may directly relate to the efficiency of the format. As the size of the aggregation changes, the efficiency of the format may change so that a format migration may be warranted. Examples of payload formats include, but are not limited to, a list, a bitmap, and a hash table. Further, any of these payload formats can be enhanced with one or more data structures, such as a Bloom Filter, to optimize processing efficiency for aggregation. In one embodiment, the list is an optimal format for a relatively small set of aggregation values, the bitmap is an optimal format for a dense range of aggregation values, and the hash table is an optimal format for a medium or large set of aggregation values.

Figure 3:
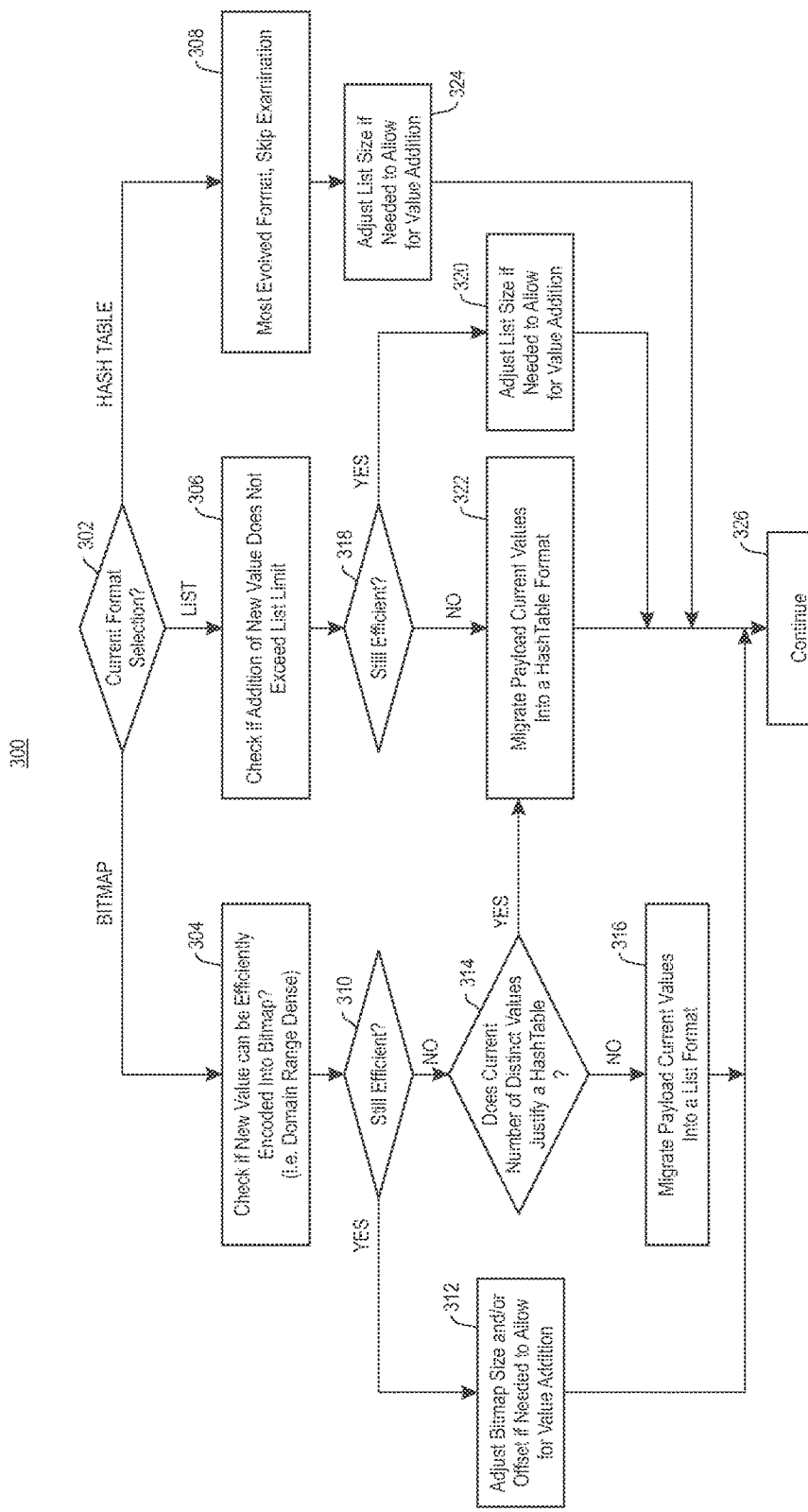
FIG. 3 depicts a flow chart illustrating a process for evaluating payload format efficiency.

Referring to FIG. 3, a flow chart (300) is provided illustrating a process for evaluating payload format efficiency. As shown, an assessment is conducted for the current payload format selection (302). In one embodiment, the assessment is conducted with respect to three different formats, including a list, a bitmap, and a hash table, although this quantity and selection of formats should not be considered limiting, and the process shown herein may be expanded to include additional or alternative formats. Following the assessment at step (302), the formats are evaluated for efficiency. In one embodiment, the efficiency evaluation is based on memory space required of the assessed format for the aggregation. In one embodiment, the efficiency evaluation pertains to processing efficiency in terms of adding values based on a number of values present in the payload format. With respect to the assessed payload format being a bitmap representation, the new aggregation value(s)

are evaluated to determine if they can be efficiently encoded into the bitmap payload format (304), i.e. domain range dense. Similarly, with respect to the assessed payload format being a list representation, the new aggregation value(s) are evaluated to determine if the addition or projected addition will exceed the limit for the list (306). With respect to the assessed payload format being a hash table, this format is considered to be an evolved format so that the efficiency examination may be omitted (308). Accordingly, prior to migration of the payload format, the efficiency of an existing payload is shown herein subject to an efficiency evaluation for one or more new aggregation values.

With respect to the bitmap evaluation (304), it is determined if this format is considered efficient in view of the new aggregation value(s) (310). An affirmative response to the determination at step (310) is followed by adjusting the bitmaps while still maintaining the efficiency of the format (312). In one embodiment, the adjustment includes an adjustment of the bitmap size and/or offset, if needed, to allow for addition of one or more aggregation value(s). However, a non-affirmative response to the determination at step (310) is an indication that a more efficient format may be warranted. As shown, it is determined if the current quantity of distinct values justifies migration to a more efficient format, such as a hash table (314). A non-affirmative response to the determination at step (314) is an indication that a less efficient format is warranted. In this example, the list format is less efficient than the bitmaps format representation, and as such, the current values in the payload are migrated from the bitmap format to the list format (316).

Similar to the bitmap evaluation shown in steps (310)-(316), the list and hash table efficiency evaluations are also demonstrated. With respect to the list evaluation (306), it is determined if this format is considered efficient in view of the new aggregation value(s) (318). An affirmative response to the determination at step (318) is followed by adjusting the list while still maintaining the efficiency of the format (320). In one embodiment, the adjustment includes an adjustment of the list size, if needed, to allow for addition of one or more aggregation value(s). However, a non-affirmative response to the determination at step (318) or an affirmative response to the determination at step (314) is an indication that a more efficient format may be warranted. As shown, the current values in the payload are migrated from the list or the bitmap format into a hash table format (322). In this example, the hash table format is considered more efficient than the list format representation, and as such, the migration is from the list format to the hash table. In one embodiment, the migration of payload formats from the list representation is to a bitmap representation, as this is considered an intermediate format from the selection of formats described herein.

As shown at step (308), the hash table format is considered in one embodiment as a most evolved format with respect to efficiency. Following step (308), the hash table size may be adjusted, if necessary, to accommodate addition of one or more aggregation values (324). Following the adjustments at one of steps (312), (320), or (324), or migrations at one of steps (316) or (322), the process of aggregative the new value(s) into the payload format continues (326).

In one embodiment, the migration may include bringing together two or more data structures with different format encoding. For example, in a multi-processing environment two or more computational elements may each have different formats for representing the values of the aggregation. To support the migration, a combined aggregate is formed by merging the formats. Merging may entail converting one or both of the formats into the payload format for the aggregate. In one embodiment, a mapping function is employed to support the conversion.

Figure 4:
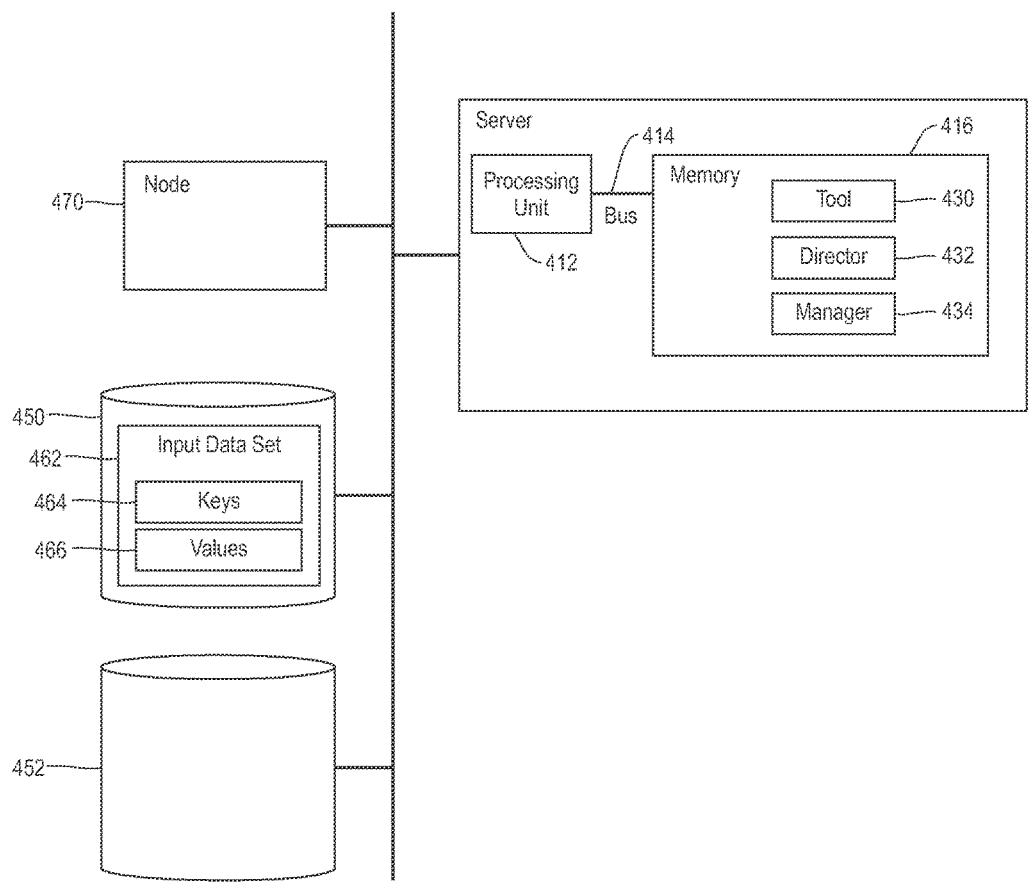
FIG. 4 depicts a block diagram illustrating hardware components of a system for supporting the dynamic format migration described herein.

The process shown in FIGS. 1-3 may be embedded in a computer system with tools to support the aggregation evaluation with respect to adaptively migrating a payload format. Referring to FIG. 4, a block diagram (400) is provided illustrating a computer system to support the adaptive migration, and more specifically, illustrating hardware components to support and enable the functionality of the adaptive migration. As shown, a server (410) is provided with a processor (412), also referred to herein as a processing unit, operatively coupled to memory (416) across a bus (414). The server (410) is further provided in communication with persistent storage (450). In one embodiment, storage (450) is maintained in a data center accessible by both the server (410) and other processing nodes. As shown, an input data set is processed. In the system shown herein, the input data set (462) is stored at a memory location remote from the server (410), and is communicated to the server (410) across a network connection. The input data set (462) is shown to contain keys (464) and values (466). In one embodiment, the input data set (462) may be storage on a memory location local to the persistent storage (450).

A tool (430) is provided local to the server (410) and in communication with the processing unit (412). The tool (430) functions to adaptively migrate an aggregation payload format associated with the input data set (462). In one embodiment, the tool (430) may be on a node (470) in communication with the server (410) across the network connection. The tool (430) is shown herein with two components, including a director (432) and a manager (434). Together, these components support the migration of the aggregate payload. The director (432) functions to scan the input data set (462) and to aggregate the scanned data set on a select key and value. The director (432) evaluates the aggregation with respect to a payload storage format and selects an initial format based on an aggregation function. This evaluation includes an examination of one or more payload aggregation formats. In addition, the director (432) stores the aggregation in the selected format at a second memory location (452). Accordingly, the director (432) and its functionality are related to the initial processor in the input data set.

In addition to the director, the manager (434) is provided to address subsequent processing of the aggregation. More specifically, the manager (434) dynamically evaluates the aggregation and selectively migrates the selected payload format to a new format based on an evaluation of the aggregation. The migration of the payload format includes a conversion by the manager (434) of the selected payload format to the new format. In one embodiment, the migration that takes place by the manager (434) migrates the current values of the payload into an alternate format. In one embodiment, the manager (434) adjusts the size of the payload formats to accommodate the aggregation. In one embodiment, the manager (434) creates a combined aggregation by merging two or more payload formats. The evaluation by the manager (434) includes an assessment of a current payload format as well as evaluation of efficiency of the assessed format for the aggregation. The assessment is based on memory space required of the assessed format from the aggregation, or the addition of one or more values to the current payload format.

The tools (432) and (434) are separately accessible. More specifically, the tools (432) and (434) are shown local to the server (410), although in one embodiment, the tools may be separately stored at different server locations in a distributed resources system, and/or in a cloud sharing environment. In one embodiment, the input data set is stored at a first memory location, referred to herein as storage (450), and the migrated payload is stored at a second memory location (452). In the example shown herein, the first and second memory locations are on different persistent storage devices. In one embodiment, the tools (432) and (434) are embedded in an application that together supports the functionality of the separate tools.

The tools (432) and (434) may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tools.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 5:
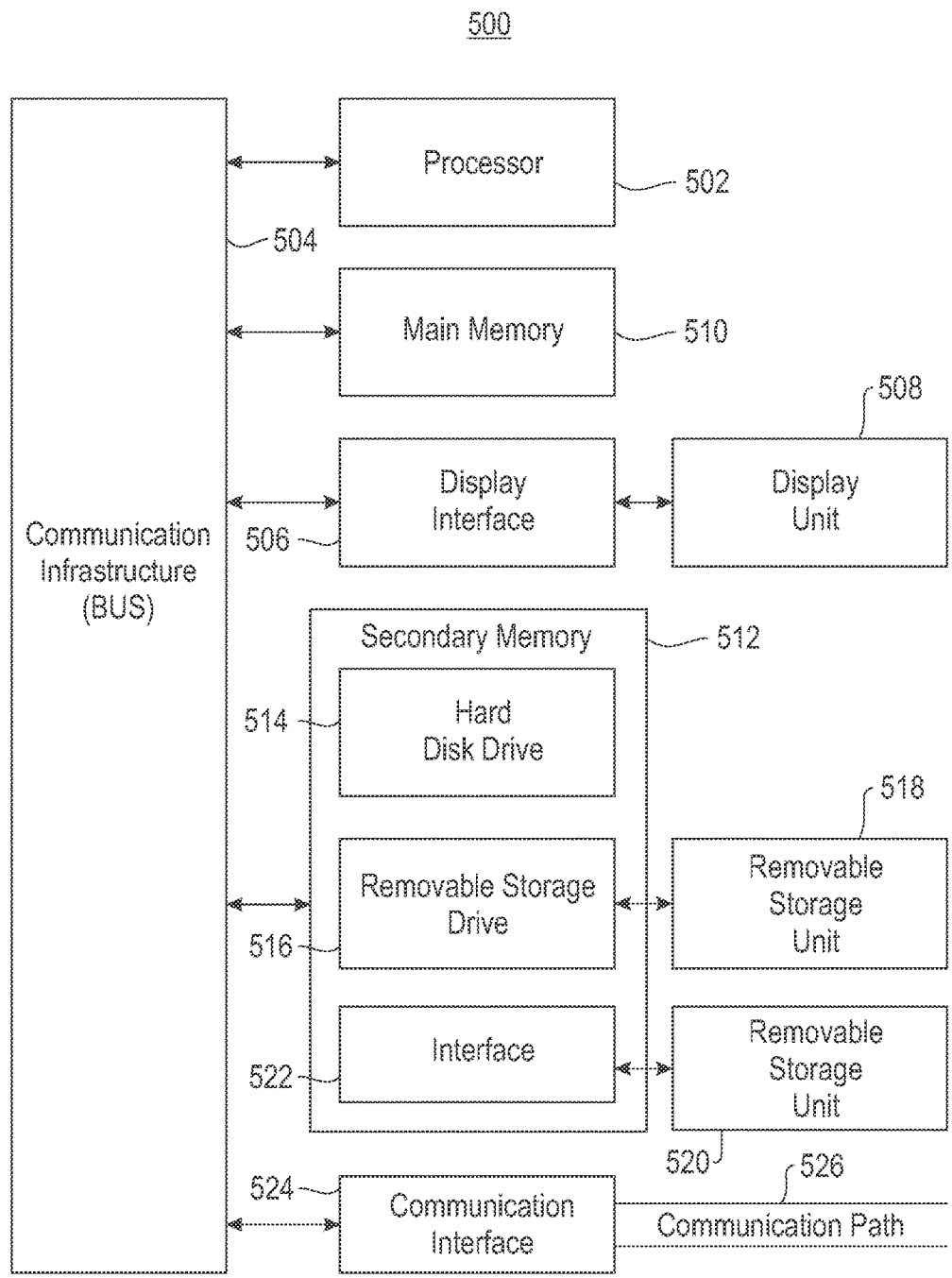
FIG. 5 depicts a block diagram of a computer system and associated components for implementing an embodiment.

Referring now to the block diagram of FIG. 5, additional details are now described with respect to implementing an embodiment of the present invention. The computer system includes one or more processors, such as a processor (502). The processor (502) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516).

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524). Communications interface (524) allows software and data to be transferred between the computer system and external devices. Examples of communications interface (524) may include a modem, a network interface (such as an Ethernet card), a communications port, or a PCMCIA slot and card, etc. Software and data transferred via communications interface (524) is in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present invention as discussed herein. In particular, the computer programs, when run, enable the processor (502) to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is understood that the teachings of the embodiments recited herein are capable of being implemented to operate in a cloud computing environment, or in conjunction with any other type of computing environment now known or later developed. Furthermore, by supporting the embodiments in the cloud computing environment, the associated tools and template may be configured for web-based support and authoring. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
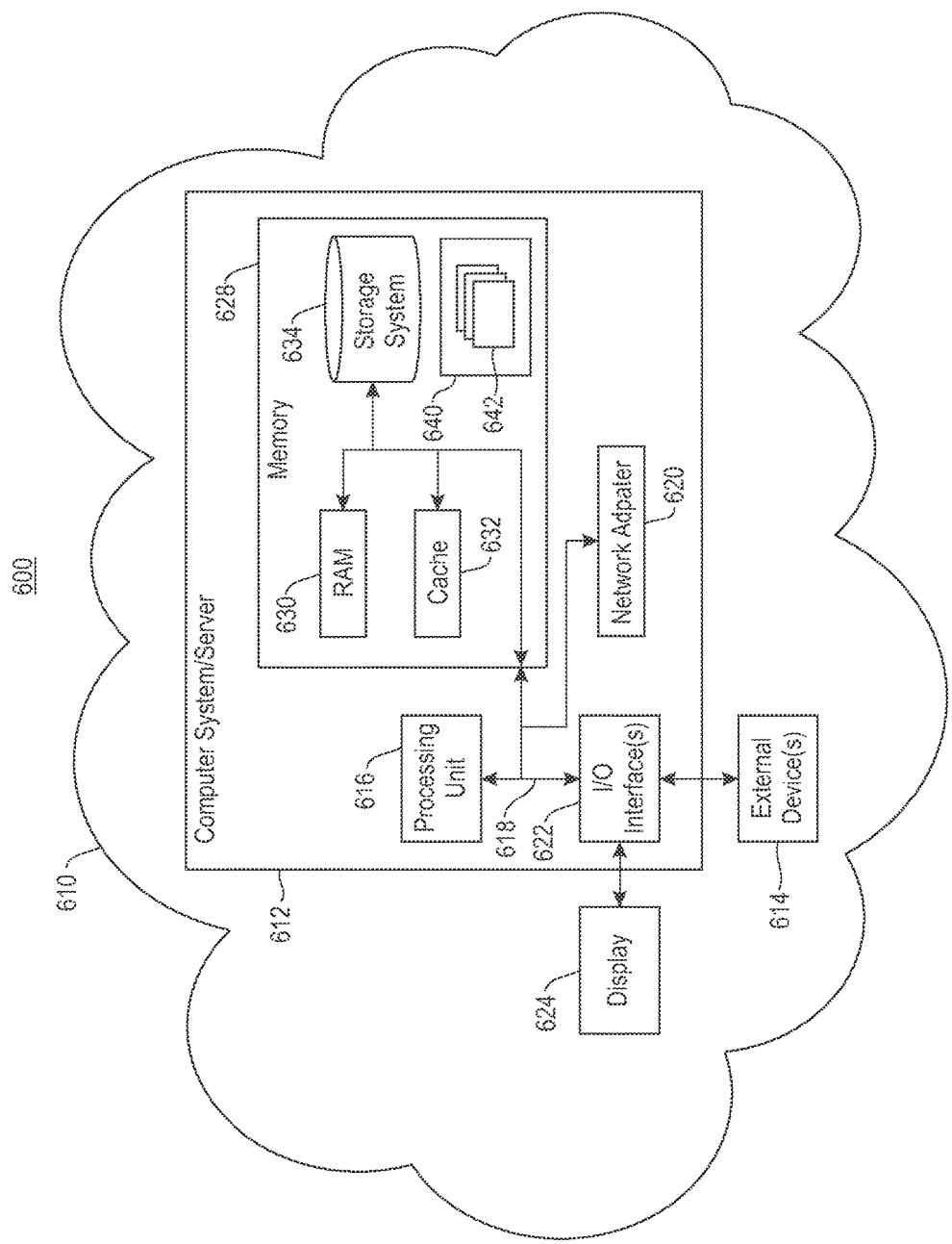
FIG. 6 depicts a block diagram of an example of a cloud computing node.

Referring now to FIG. 6, a schematic of an example of a cloud computing node (600) is shown. Cloud computing node (610) is only one example of a suitable cloud computing node and is not intended to suggest any limitation as to the scope of use or functionality of embodiments of the invention described herein. Regardless, cloud computing node (610) is capable of being implemented and/or performing any of the functionality set forth hereinabove.

In cloud computing node (610) there is a computer system/server (612), which is operational with numerous other general purpose or special purpose computing system environments or configurations. Examples of well-known computing systems, environments, and/or configurations that may be suitable for use with computer system/server (612) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (612) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (612) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server (612) in cloud computing node (610) is shown in the form of a general-purpose computing device. The components of computer system/server (612) may include, but are not limited to, one or more processors or processing units (616), a system memory (628), and a bus (618) that couples various system components including system memory (628) to processor (616).

Bus (618) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server (612) typically includes a variety of computer system readable media. Such media may be any available media that is accessible by computer system/server (612), and it includes both volatile and non-volatile media, removable and non-removable media.

System memory (628) can include computer system readable media in the form of volatile memory, such as random access memory (RAM) (630) and/or cache memory (632). Computer system/server (612) may further include other removable/non-removable, volatile/non-volatile computer system storage media. By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (618) by one or more data media interfaces. As will be further depicted and described below, memory (628) may include at least one program product having a set (e.g., at least one) of program modules that are configured to carry out the functions of embodiments of the invention.

Program/utility (640), having a set (at least one) of program modules (642), may be stored in memory (628) by way of example, and not limitation, as well as an operating system, one or more application programs, other program modules, and program data. Each of the operating system, one or more application programs, other program modules, and program data or some combination thereof, may include an implementation of a networking environment. Program modules (642) generally carry out the functions and/or methodologies of embodiments of the invention as described herein.

Computer system/server (612) may also communicate with one or more external devices (614) such as a keyboard, a pointing device, a display (624), etc.; one or more devices that enable a user to interact with computer system/server (612); and/or any devices (e.g., network card, modem, etc.) that enable computer system/server (612) to communicate with one or more other computing devices. Such communication can occur via Input/Output (I/O) interfaces (622). Still yet, computer system/server (612) can communicate with one or more networks such as a local area network (LAN), a general wide area network (WAN), and/or a public network (e.g., the Internet) via network adapter (620). As depicted, network adapter (620) communicates with the other components of computer system/server (612) via bus (618). It should be understood that although not shown, other hardware and/or software components could be used in conjunction with computer system/server (612). Examples, include, but are not limited to: microcode, device drivers, redundant processing units, external disk drive arrays, RAID systems, tape drives, and data archival storage systems, etc.

Figure 7:
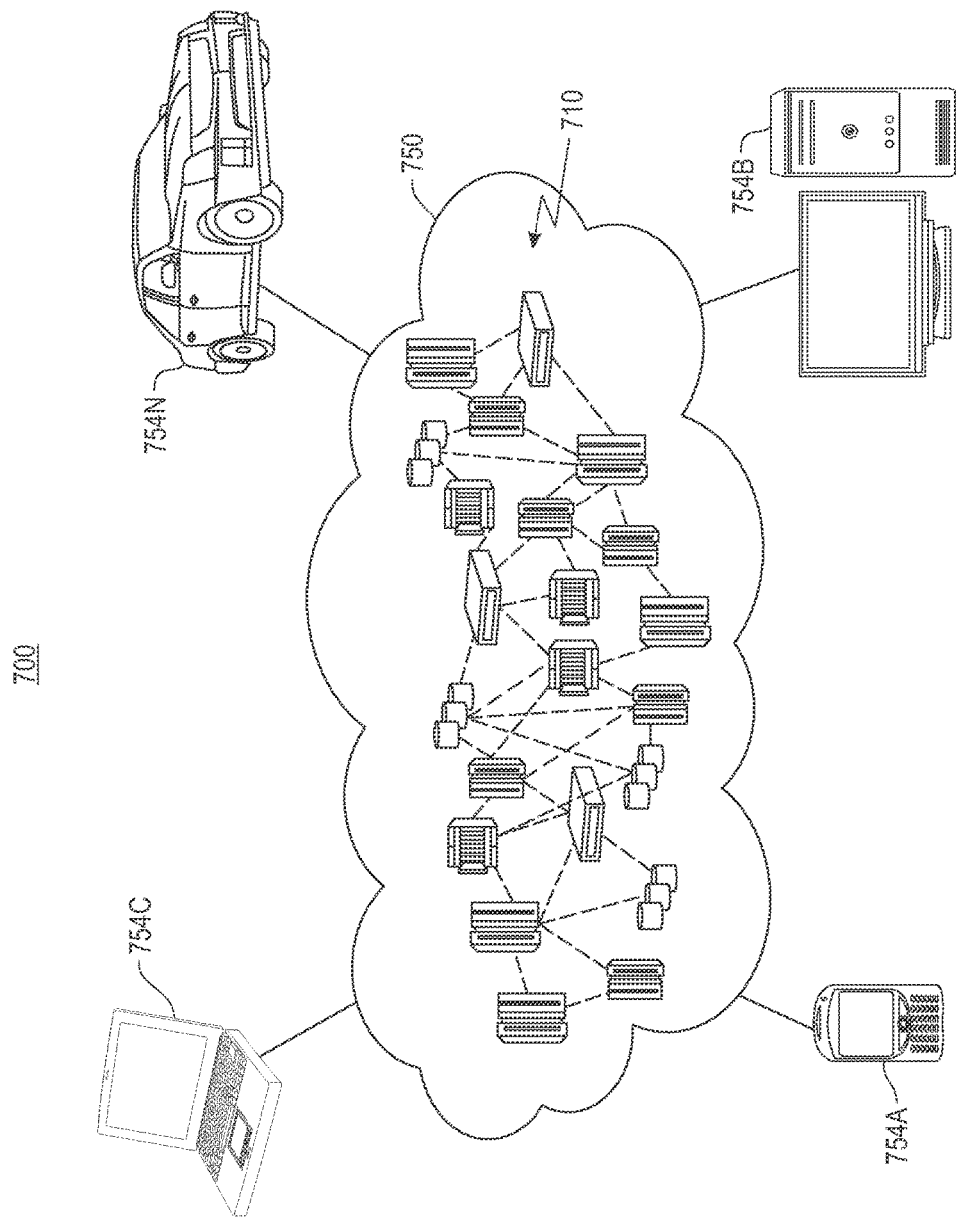
FIG. 7 depicts a block diagram illustrating a cloud computing environment.

Referring now to FIG. 7, illustrative cloud computing environment (700) is depicted. As shown, cloud computing environment (750) comprises one or more cloud computing nodes (710) with which local computing devices used by cloud consumers, such as, for example, personal digital assistant (PDA) or cellular telephone (754A), desktop computer (754B), laptop computer (754C), and/or automobile computer system (754N) may communicate. Nodes (710) may communicate with one another. They may be grouped (not shown) physically or virtually, in one or more networks, such as Private, Community, Public, or Hybrid clouds as described hereinabove, or a combination thereof. This allows cloud computing environment (750) to offer infrastructure, platforms and/or software as services for which a cloud consumer does not need to maintain resources on a local computing device. It is understood that the types of computing devices (754A)-(754N) shown in FIG. 7 are intended to be illustrative only and that computing nodes (710) and cloud computing environment (750) can communicate with any type of computerized device over any type of network and/or network addressable connection (e.g., using a web browser).

Figure 8:
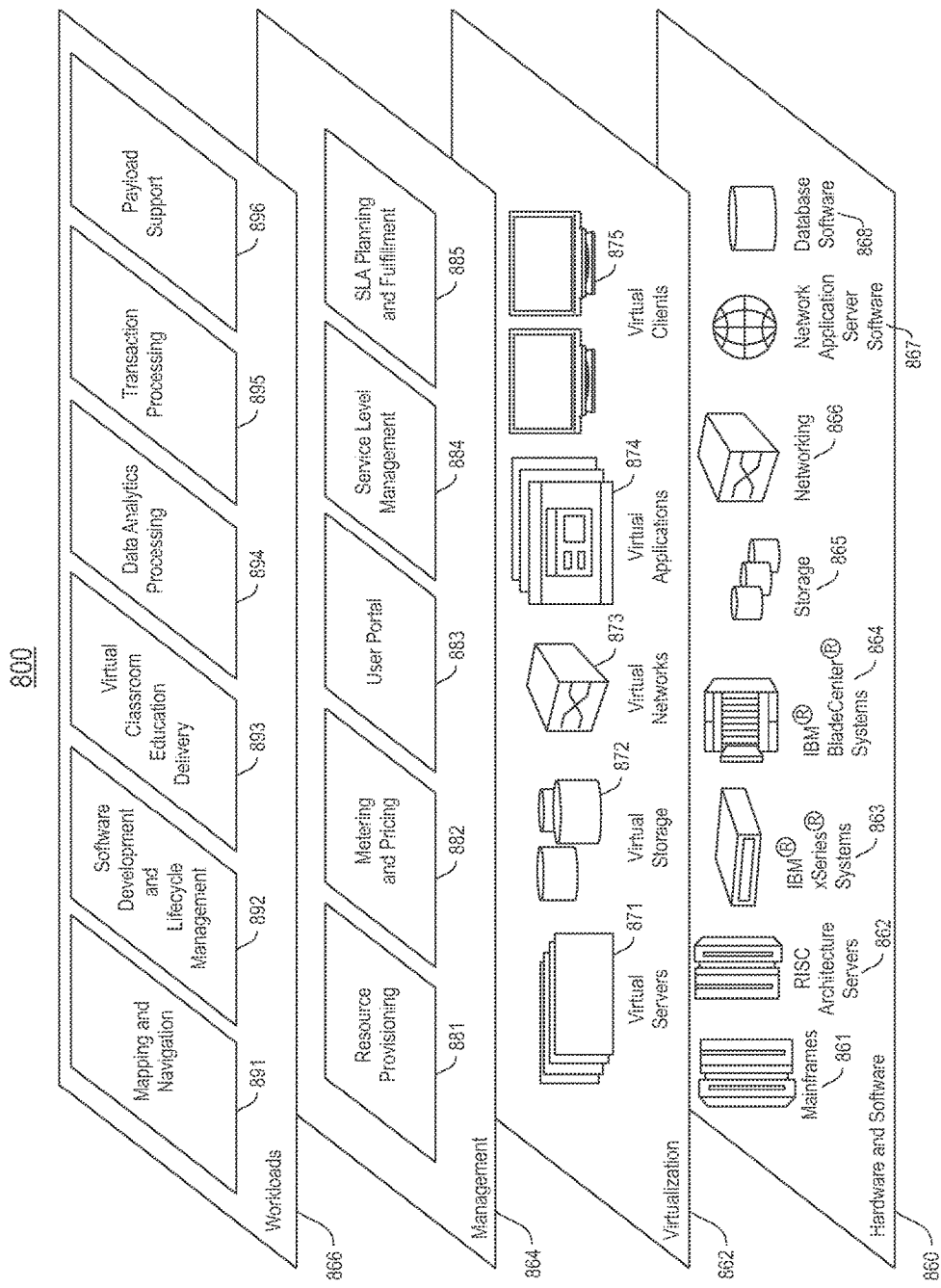
FIG. 8 depicts a block diagram illustrating a set of functional abstraction layers provided by the cloud computing environment shown in FIG. 6.

Referring now to FIG. 8, a set of functional abstraction layers provided by cloud computing environment (750) (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer (860) includes hardware and software components. Examples of hardware components include: mainframes (861); RISC (Reduced Instruction Set Computer) architecture based servers (862); servers (863); blade servers (864); storage devices (865); and networks and networking components (866). In some embodiments, software components include network application server software (867) and database software (868).

Virtualization layer (870) provides an abstraction layer from which the following examples of virtual entities may be provided: virtual servers (871); virtual storage (872); virtual networks (873), including virtual private networks; virtual applications and operating systems (874); and virtual clients (875).

In one example, management layer (880) may provide the functions described below. Resource provisioning (881) provides dynamic procurement of computing resources and other resources that are utilized to perform tasks within the cloud computing environment. Metering and Pricing (882) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (883) provides access to the cloud computing environment for consumers and system administrators. Service level management (884) provides cloud computing resource allocation and management such that required service levels are met. Service Level Agreement (SLA) planning and fulfillment (885) provides pre-arrangement for, and procurement of, cloud computing resources for which a future requirement is anticipated in accordance with an SLA.

Workloads layer (890) provides examples of functionality for which the cloud computing environment may be utilized. Examples of workloads and functions which may be provided from this layer include: mapping and navigation (891); software development and lifecycle management (892); virtual classroom education delivery (893); data analytics processing (894); transaction processing (895); and payload management support (896). The primary function of the architecture is to represent a knowledge model as a graph, and ingest the model into a document structure to support both efficient retrieval of data represented in the graph and composition of new assertions associated with data represented in the graph.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of dynamic assessment and selective migration of an aggregation payload is based on various factors, including efficiency, and physical constraints to the system.

It will be appreciated that, although specific embodiments of the invention have been described herein for purposes of illustration, various modifications may be made without departing from the spirit and scope of the invention. In particular, balanced and partly balanced tree data structures can be used as the payload formats for aggregation, in addition to the bitmap, list, and hash table formats described herein. Accordingly, the scope of protection of this invention is limited only by the following claims and their equivalents.

What is claimed is:

1. A method comprising:
   scanning an input data set containing keys and values;
   aggregating the scanned input set on a select key and value;
   evaluating the aggregation with respect to a payload storage format and selecting an initial format of an aggregation result based on an aggregation function;
   storing an updated aggregation payload in the selected payload format; and
   responsive to a subsequent aggregation of keys and values, dynamically re-evaluating the aggregation and selectively migrating the selected payload format to a new format based on the evaluation.

2. The method of claim 1, wherein the aggregation evaluation includes examination of one or more payload aggregation formats.

3. The method of claim 2, further comprising assessing a current payload format and evaluating efficiency of the assessed format for the aggregation, the assessment based on a factor selected from the group consisting of: memory space required of the assessed format from the aggregation, processing cost of adding one or more additional values to the current payload format, and numerical stability of the updated aggregation payload in the current payload format, and further comprising evaluating the selected factor with respect to the current aggregation and current resource availability.

4. The method of claim 3, further comprising migrating payload content into an alternate format.

5. The method of claim 3, further comprising adjusting a size of the payload format for accommodating the aggregation.

6. The method of claim 1, wherein the selection of the initial format is based on a prior aggregation evaluation for one or more other aggregation keys on a query selected from the group consisting of: a present query and a prior query.

7. The method of claim 1, further comprising creating a combined aggregate by merging two or more payload formats.

8. A computer program product for adaptive migration of an aggregate payload format, the computer program product comprising a computer readable storage device having program code embodied therewith, the program code executable by a processing unit to:
   scan an input data set containing keys and values;
   aggregate the scanned input set on a select key and value;
   evaluate the aggregation with respect to a payload storage format and select an initial format of an aggregation result based on an aggregation function;
   store an updated aggregation payload in the selected payload format; and
   responsive to a subsequent aggregation of keys and values, dynamically re-evaluate the aggregation and selectively migrate the selected payload format to a new format based on the evaluation.

9. The computer program product of claim 8, wherein the aggregation evaluation includes examination of one or more payload aggregation formats.

10. The computer program product of claim 9, further comprising program code to assess a current payload format and evaluate efficiency of the assessed format for the aggregation, the assessment based on a factor selected from the group consisting of: memory space required of the assessed format from the aggregation, processing cost of adding one or more additional values to the current payload format, and numerical stability of the updated aggregation payload in the current payload format.

11. The computer program product of claim 10, further comprising program code to migrate payload content into an alternate format.

12. The computer program product of claim 11, further comprising program code to adjust a size of the payload format to accommodate the aggregation.

13. The computer program product of claim 8, wherein the selection of the initial format is based on a prior aggregation evaluation for one or more other aggregation keys on a query selected from the group consisting of: a present query and a prior query.

14. The computer program product of claim 8, further comprising program code to create a combined aggregate by merging two or more payload formats.

15. A computer system comprising:
   a processing unit operatively coupled to memory;
   an input data set stored at a first memory location, the input data set containing keys and values;
   a tool in communication with the processing unit to adaptively migrate an aggregate payload format, including:
      a director to scan the input data set and to aggregate the scanned data set on a select key and value;
      the director to evaluate the aggregation with respect to a payload storage format and to select an initial format of an aggregation result based on an aggregation function;
      the director to store an updated aggregation payload in the selected format at s second memory location; and
      a manager in communication with the director, the manager to function in response to a subsequent aggregation of keys and values, including the manager to dynamically re-evaluate the aggregation and to selectively migrate the selected payload format to a new format based on the evaluation, wherein the migration includes a conversion of the selected payload format to the new format.

16. The computer system of claim 15, wherein the aggregation evaluation performed by the director includes examination of one or more payload aggregation formats.

17. The computer system of claim 16, further comprising the manager to assess a current payload format and evaluate efficiency of the assessed format for the aggregation, the assessment based on a factor selected from the group consisting of: memory space required of the assessed format from the aggregation, processing cost of adding one or more additional values to the current payload format, and numerical stability of the updated aggregation payload in the current payload format.

18. The computer system of claim 17, further comprising the manager to migrate payload content into an alternate format.

19. The computer system of claim 17, further comprising the manager to adjust a size of the payload format to accommodate the aggregation.

20. The computer system of claim 15, further comprising the manager to create a combined aggregate by merging two or more payload formats.

* * * * *